Sept. 5, 1933.  W. R. ALLRED  1,925,079
GASOLINE TANK CLOSURE
Filed April 9, 1932
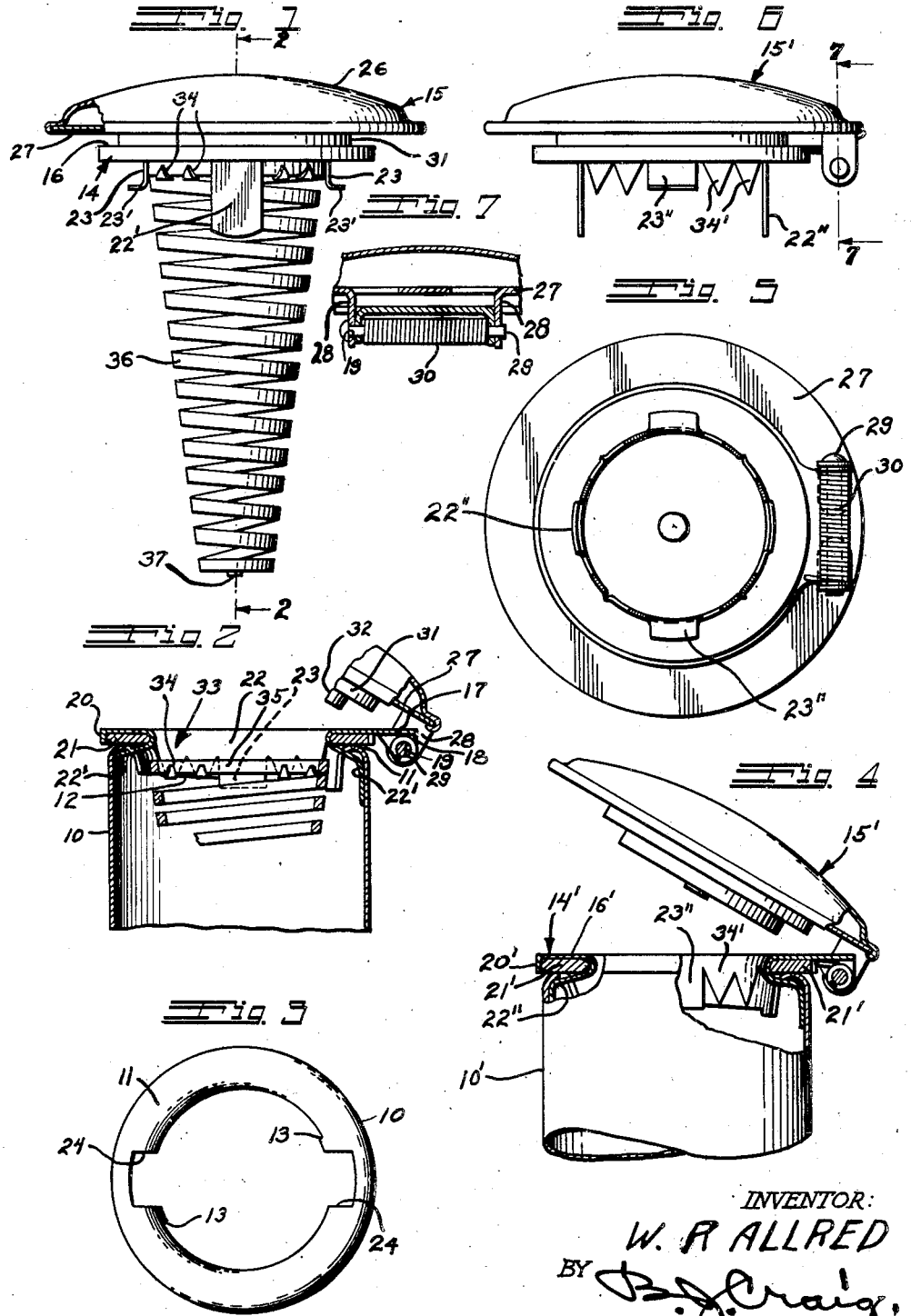
INVENTOR:
W. R. ALLRED
BY B. J. Craig,
ATTORNEY Patented Sept. 5, 1933

1,925,079

UNITED STATES PATENT OFFICE 1,925,079

GASOLINE TANK CLOSURE

William R. Allred, Los Angeles, Calif.

Application April 9, 1932. Serial No. 604,170

7 Claims. (Cl. 220—86)

This invention relates to closures for the gasoline tanks for automobiles.

The general object of the invention is to provide an improved closure for the gasoline tank of an automobile wherein the closure cannot be removed and wherein a novel means is provided for preventing the theft of gasoline from the tank.

A further object of the invention is to provide a novel fastening means for securing the closure of an automobile gasoline tank in position.

Another object of the invention is to provide a member adapted to be inserted and locked on the filling neck of the gasoline tank and wherein the member is flexible, allowing the gasoline dispensing nozzle to move while within the same.

Other objects of the invention will be apparent from the following description taken in connection with the accompanying drawing wherein:

Fig. 1 is a side elevation of a device embodying the features of my invention.

Fig. 2 is a fragmentary section taken on line 2—2 of Fig. 1 showing details of the device.

Fig. 3 is a top plan view of a gasoline tank neck.

Fig. 4 is a side elevation, partly in section, showing a modification of my invention.

Fig. 5 is a bottom plan view of the modified cap.

Fig. 6 is a side elevation of the modified cap and

Fig. 7 is a section on line 7—7 of Fig. 6.

Referring to the drawing by reference characters, I have indicated at 10 the neck of the gasoline tank. This neck has a turned over rim or top portion 11, the lower wall of which is inclined, forming opposed cam surfaces 12 which terminate in the shoulders 13.

The closure comprises a securing portion indicated generally at 14, and a cap portion indicated generally at 15. The securing portion comprises an annular member 16, preferably made of metal and having a projecting portion 17 from which a pair of downwardly projecting ears 18 extend. These ears are apertured as at 19.

The annular member 16 is provided with a downwardly projecting flange 20 which surrounds an annular gasket 21, as shown in the drawing. The securing portion is provided with a downwardly extending central portion 22, and this portion 22, at opposed sides, is shaped to provide locking tongues 22' and, at right angles to the locking tongues, the portion 22' is shaped to provide fastening members 23 which include bent ends 23'.

In use, the securing member is inserted in the neck 10 which is suitably secured to the gasoline tank. The bent portions 23' pass through notches 24. The cap and securing member are then turned through approximately 90° or until the locking tongues 22' are bent as shown in Fig. 2 and the securing member is thus locked against surreptitious removal. As the securing member is turned the portions 23' ride on the cam faces 12 and pull the gasket 21 against the rim 11 to make a tight seal.

The cap portion comprises the top part 26 and the bottom part 27, which is crimped to the periphery of the part 26. The part 27 is provided with a pair of punched out tongues 28 which are bent downwardly as shown and are disposed alongside the ears 18. A pintle pin 29 passes through the apertures 19 in the ears 18 and also passes through aligned apertures in the tongues 28. A spring 30 surrounds the pintle pin 29 and engages the closure 15 to urge it to closed position.

The closure is provided with a suitable gasket 31 and with a plug member 32 which are suitably secured to the bottom 27 of the cap 15. The plug 32 fits within the aperture 33 and the gasket 31 engages the top of the annular member 16 to hold the parts assembled.

The central portion 22 is provided with spaced teeth 34 which engage the top ring 35 of a flexible cup 36. This cup 36 is made of spring material so that it is flexible and preferably tapers and is closed at the bottom by being bent as shown at 37. The cup 36 flexes when the nozzle of a gasoline dispensing hose is inserted therein while at the same time it prevents the entry of a rubber tube or other means which might be used to syphon the gasoline from the tank.

In Figs. 4, 5, 6 and 7 I show a modification of my invention wherein the neck 10' is provided with securing member 14' which includes an annular member 16' having a flange 20', a gasket 21', locking tongues 22'', fastening members 23'' and other portions identical with that shown in Fig. 1. A cap 15' similar in all respects to the cap 15 is provided and it is hinged to the securing member 14' as previously described.

In the modification the teeth 34' are directed downwardly and do not engage the cup member 36 and thus it will be seen that in the modification accidental removal or theft of the gasoline cap is avoided.

Having thus described my invention, I claim:

1. The combination of a gasoline tank neck having a rim, a securing member including an annular body, means to secure said securing member to said neck, a cap, means to hinge said cap to said securing member, means normally urging said cap to closed position, a gasket carried by the under surface of said cap and normally engaging the top of said securing member, and a flexible cup secured to said securing member and projecting into said neck.

2. The combination of a gasoline tank neck having a rim with a downwardly directed portion thereon included to provide cam surfaces, a securing member including an annular body having a gasket thereon, said body having a pair of fastening members, said fastening members having bent ends engaging said cam surfaces, a cap including a top member and a bottom member hinged to said securing member, means normally urging said cap to closed position and a cup secured to said securing member and arranged in said neck.

3. The combination of a gasoline neck having a rim with a downwardly directed portion thereon included to provide cam surfaces, said rim being notched, a securing member including an annular body having a gasket thereon, said body having a pair of fastening members, said fastening members having bent ends engaging said cam surfaces and having locking tongues bent to extend through said notches to prevent rotation of said body, a cap including a top member and a bottom member hinged to said securing member, means normally urging said cap to closed position, a gasket carried by said cap and normally engaging the top of said securing member and a flexible foraminous cup arranged in said neck.

4. The combination of a gasoline tank neck having a rim with a downwardly directed portion thereon inclined to provide cam surfaces, said rim being notched, a securing member including an annular body having a peripheral flange thereon, a gasket on said body engaging said flange, said body having a pair of fastening members thereon, said fastening members having bent ends engaging said cam surfaces, said body also having locking tongues bent to extend through said notches to prevent rotation of said body, a cap pivoted on said securing member, means normally urging said cap to a closed position and a flexible cup secured to said securing member and projecting into said neck.

5. The combination of a gasoline tank neck having a rim with a downwardly directed portion thereon inclined to provide cam surfaces, said rim being notched, a securing member including an annular body having a peripheral flange thereon, said body having a pair of fastening members thereon, said fastening members having bent ends engaging said cam surfaces, said body also having locking tongues bent to extend through said notches to prevent rotation of said body, said securing member having a pair of ears thereon, and a cap including a top member, and a bottom member, said bottom member having tongues, a hinge pin passing through said ears and said tongues to pivot said cap in place, spring means normally urging said cap to a closed position, said inner member having teeth thereon and a flexible cup secured to said securing member by said teeth.

6. The combination of a gasoline tank neck having a rim with a downwardly directed portion thereon inclined to provide cam surfaces, said rim being notched, a securing member including an annular body having a peripheral flange thereon, a gasket on said body and engaging said flange, said body having a pair of fastening members thereon, said fastening members having bent ends engaging said cam surfaces, said body also having locking tongues bent to extend through said notches to prevent rotation of said body, said securing member having a pair of ears thereon, a cap including a top member, and a bottom member, said bottom member having tongues, a hinge pin passing through said ears and said tongues to pivot said cap in place, spring means normally urging said cap to a closed position, a gasket carried by the under surface of said cap and normally engaging the top of said securing member, a plug on said cap adapted to enter the body of said securing member, said inner member having teeth thereon and a flexible cup secured to said securing member by said teeth.

7. The combination of a gasoline tank neck having a rim with a downwardly directed portion thereon inclined to provide cam surfaces, said rim being notched, a securing member including an annular body having a peripheral flange thereon, said body having a pair of fastening members thereon, said fastening members having bent ends engaging said cam surfaces, said body also having locking tongues bent to extend through said notches to prevent rotation of said body and a cap mounted on said securing member.

WILLIAM R. ALLRED.